United States Patent
Jang et al.

(10) Patent No.: US 10,051,250 B2
(45) Date of Patent: Aug. 14, 2018

(54) METHOD OF AUTOMATICALLY CORRECTING PROJECTION AREA BASED ON IMAGE PHOTOGRAPHED BY PHOTOGRAPHING DEVICE AND SYSTEM THEREFOR

(71) Applicant: CJ CGV CO., LTD., Seoul (KR)

(72) Inventors: Kyung Yoon Jang, Seoul (KR); Hyung Jin Yoon, Anyang-si (KR)

(73) Assignee: CJ CGV CO., LTD., Seoul (KR)

( * ) Notice: Subject to any disclaimer, the term of this patent is extended or adjusted under 35 U.S.C. 154(b) by 0 days.

(21) Appl. No.: 15/461,946

(22) Filed: Mar. 17, 2017

(65) Prior Publication Data

US 2018/0176520 A1 Jun. 21, 2018

(30) Foreign Application Priority Data

Dec. 16, 2016 (KR) .................. 10-2016-0172309

(51) Int. Cl.
*H04N 9/31* (2006.01)
*G06K 9/46* (2006.01)
*G06K 9/62* (2006.01)

(52) U.S. Cl.
CPC ............ *H04N 9/3185* (2013.01); *G06K 9/46* (2013.01); *G06K 9/6201* (2013.01); *H04N 9/3194* (2013.01)

(58) Field of Classification Search
CPC ....... H04N 9/3185; H04N 9/31; H04N 9/3194
USPC ............... 348/747, 746, 744, 745, 806, 189
See application file for complete search history.

(56) References Cited

U.S. PATENT DOCUMENTS

| | | | |
|---|---|---|---|
| 9,524,578 B2* | 12/2016 | Fuchikami | ............ G06T 15/20 |
| 2005/0270496 A1 | 12/2005 | Mochizuki | |
| 2010/0328453 A1 | 12/2010 | Kiesshauer | |
| 2011/0211065 A1 | 9/2011 | Furui | |
| 2014/0078260 A1 | 3/2014 | Taubin et al. | |
| 2014/0333585 A1 | 11/2014 | Suzuki et al. | |

FOREIGN PATENT DOCUMENTS

| | | |
|---|---|---|
| JP | 2008-187566 A | 8/2008 |
| JP | 2016-014720 A | 1/2016 |
| KR | 10-2016-0031966 | 3/2016 |
| KR | 10-1601810 B1 | 3/2016 |

OTHER PUBLICATIONS

Korean Office Action dated Nov. 19, 2017 for corresponding Korean Application No. 10-2016-0172309.
International Search Report for PCT/KR2017/003136 dated Sep. 6, 2017.

* cited by examiner

Primary Examiner — Brian Yenke
Assistant Examiner — Jean W Desir
(74) *Attorney, Agent, or Firm* — Hauptman Ham, LLP

(57) ABSTRACT

The present invention relates to automatic correction of an area on which contents are projected by a projector, i.e., a so-called projection area, in a theater, and specifically, to a method and system for automatically correcting a projection area by photographing a projection area in the theater using a photographing device such as a camera or the like, and matching the image photographed like this, coordinates of a projection area projected by the projector and finally a contents image projected on a projection surface such as a screen, a wall or the like so that eventually the contents image may be properly output in an effective projection area of a projection surface in the theater.

10 Claims, 9 Drawing Sheets

METHOD OF AUTOMATICALLY CORRECTING PROJECTION AREA BASED ON IMAGE PHOTOGRAPHED BY PHOTOGRAPHING DEVICE AND SYSTEM THEREFOR

CROSS REFERENCE TO RELATED APPLICATION

The present application claims the benefit of Korean Patent Application No. 10-2016-0172309 filed in the Korean Intellectual Property Office on Dec. 16, 2016, the entire contents of which are incorporated herein by reference.

TECHNICAL FIELD

The present invention relates to automatic correction of an area on which contents are projected by a projector, i.e., a so-called projection area, in a theater, and specifically, to a method and system for automatically correcting a projection area by photographing a projection area in the theater using a photographing device such as a camera or the like, and matching the image photographed like this, coordinates of a projection area projected by the projector and finally a contents image projected on a projection surface such as a screen, a wall or the like so that eventually the contents image may be properly output in an effective projection area of a projection surface in the theater.

BACKGROUND ART

The cases of misplaced projectors are frequent in a theater due to vibration of an air conditioning system, an audio system or the like, and when the projectors are misplaced like this, contents such as a movie, an advertisement material or the like may not be projected at a correct location on a projection surface such as a screen or a wall, and thus the audience may not be provided with a proper motion picture projection service. Accordingly, operators of a theater need to correct the projection area frequently, and conventionally, such a projection area correction has been performed manually by an engineer.

However, when the projection area correction is performed manually, accuracy of the work is lowered since the work is done by a human being, and in addition, since the work of correcting the projection area should be performed frequently in the theater, the manpower and cost consumed therefor are not small.

DISCLOSURE OF INVENTION

Technical Problem

The present invention is to automatically correct distortion of a projection area of a projector in a theater.

Particularly, an object of the present invention is to accomplish a correction accurately by photographing an image of a projection surface on which a structured light pattern is projected and matching a projection area in the photographed image to a projection area of a projector.

In addition, another object of the present invention is to filter a projection obstruction area in a projection area such as a wall and extract a correct effective projection area on a projection surface according thereto by using a RANSAC technique in a work of matching an image photographed by a photographing device and a projection area of a projector, i.e., in calculating relative conversion information.

In addition, still another object of the present invention is to extract a projection area further precisely by further utilizing a laser level that can mark a laser line on a projection surface and, accordingly, to accomplish extraction of an effective projection area and correction of the projection area further correctly.

Technical Solution

A method of automatically correcting a projection area according to the present invention includes the steps of: (a) acquiring a first projection surface image photographed by a photographing device; (b) mapping each pair of pixel coordinates of a projection area in the first projection surface image to each pair of pixel coordinates of a projection area projected by a projector; and (c) calculating relative conversion information between the first projection surface image and the projector using the pixel coordinates of the first projection surface image and the pixel coordinates of the projector, wherein the first projection surface image is an image of a projection surface on which a light pattern is projected.

The first projection surface image is photographed includes the steps of: converting each pair of pixel coordinates of the projector into bits; projecting a black and white image at each pair of pixel coordinates of the projector in order of time; and photographing a projection surface on which the black and white image is projected, by the photographing device.

Step (c) includes the steps of: extracting an arbitrary reference pixel $x_i$ from the projection area of the projector, extracting a corresponding pixel $c_i$ corresponding to the reference pixel $x_i$ from the first projection surface image, and calculating the relative conversion information by putting the reference pixel $x_i$ and the corresponding pixel $c_i$ in a relative conversion equation.

At step (c), first relative conversion information $H_{i \to cam}$ is calculated, and the relative conversion equation is $H_{i \to cam} = \arg\min \|Hx^i - c^i\|^2$, wherein $x^i$ denotes the reference pixel of the projection area, and $c^i$ denotes the corresponding pixel of the first projection surface image.

At step (c), second relative conversion information $H_{cam \to i}$ is further calculated, and $H_{cam \to i}$ denotes an inverse matrix of the first relative conversion information $H_{i \to cam}$.

The second relative conversion information $H_{cam \to i}$ is calculated using Random Sample Consensus (RANSAC), and a projection obstruction area created by a structure provided on the projection surface is removed from an effective projection area acquired at step (c) based on the second relative conversion information $H_{cam \to i}$.

A plurality of projectors is provided in correspondence to one projection surface, and steps (a) to (c) are performed on the first projection surface image projected by each projector, and an entire effective projection area is acquired by combining effective projection areas of the projectors.

The method of automatically correcting a projection area according to the present invention further includes the step of: (d) calculating third relative conversion information $H_{i \to image}$ between the projector and a contents image.

The method of automatically correcting a projection area according to the present invention further includes the step of: (e) acquiring a second projection surface image on which laser lines are displayed, wherein the laser lines are displayed by light output from a laser level.

The method of automatically correcting a projection area according to the present invention further includes the steps of: (f) extracting a plurality of line images from the second projection surface image and acquiring intersection points created by intersections of the line images; and (g) matching the acquired intersection points to vertexes of the contents image.

On the other hand, a system for automatically correcting a projection area according to the present invention includes: a photographing device for photographing a projection surface; a projection management device for acquiring a first projection surface image photographed by the photographing device, calculating relative conversion information by mapping each pair of pixel coordinates of a projection area in the first projection surface image to each pair of pixel coordinates of a projection area projected by a projector, and acquiring an effective projection area of the projector on the basis of the relative conversion information; and the projector for projecting an image of a projection area in a theater, wherein the first projection surface image is an image of a projection surface on which a light pattern is projected by the projector.

The system for automatically correcting a projection area according to the present invention further includes: a laser level for outputting light for displaying laser lines on the projection surface, wherein the projection management device further acquires a second projection surface image photographed by the photographing device.

The projection management device extracts a plurality of line images from the second projection surface image, acquires intersection points created by intersections of the line images, and matching the acquired intersection points to vertexes of a contents image.

Advantageous Effects

According to the present invention, there is an effect of accomplishing an automatic correction of high correction quality by using only a single photographing device in a theater of a large scale by utilizing a photographing device such as a high-resolution camera.

In addition, according to the present invention, in a multi-surface theater utilizing a screen and all the walls in the theater, particularly, since projection obstruction areas created by structures on the walls can be effectively removed, there is an effect of further accurately correcting a projection area compared with the prior art.

In addition, according to the present invention, there is an effect of precisely correcting a projection area by utilizing a laser level.

BEST MODE FOR CARRYING OUT THE INVENTION

Details of the objects and technical configuration of the present invention and operational effects according thereto will be clearly understood hereinafter by the detailed description based on the accompanying drawings attached in the specification of the present invention. Embodiments according to the present invention will be described in detail with reference to accompanying drawings.

In the following description, functional blocks shown in the figures and described below are merely examples of possible implementations. Accordingly, other functional blocks may be used in other implementations without departing from the spirit and scope of the detailed description. In addition, although one or more functional blocks of the present invention are expressed as individual blocks, one or more of the functional blocks of the present invention may be a combination of various hardware and software executing the same function.

In addition, the expression of 'including' an element is an expression of an 'open type' which merely refers to existence of a corresponding component, and it should not be construed as precluding additional components.

Furthermore, it should be construed that when an element is referred to as being connected or coupled to another element, it may be directly connected or coupled to the other element or intervening elements may be present.

In addition, it should be understood that the method of projecting an image on a curved surface described below may be implemented through connection operation of various hardware and software. For example, the method may be implemented through connection operation of a plurality of projectors and a projection management device (server) wiredly or wirelessly connected to the projectors, and the image management system may be implemented through connection operation of various hardware and software, in addition to such a connection.

Figure 1:
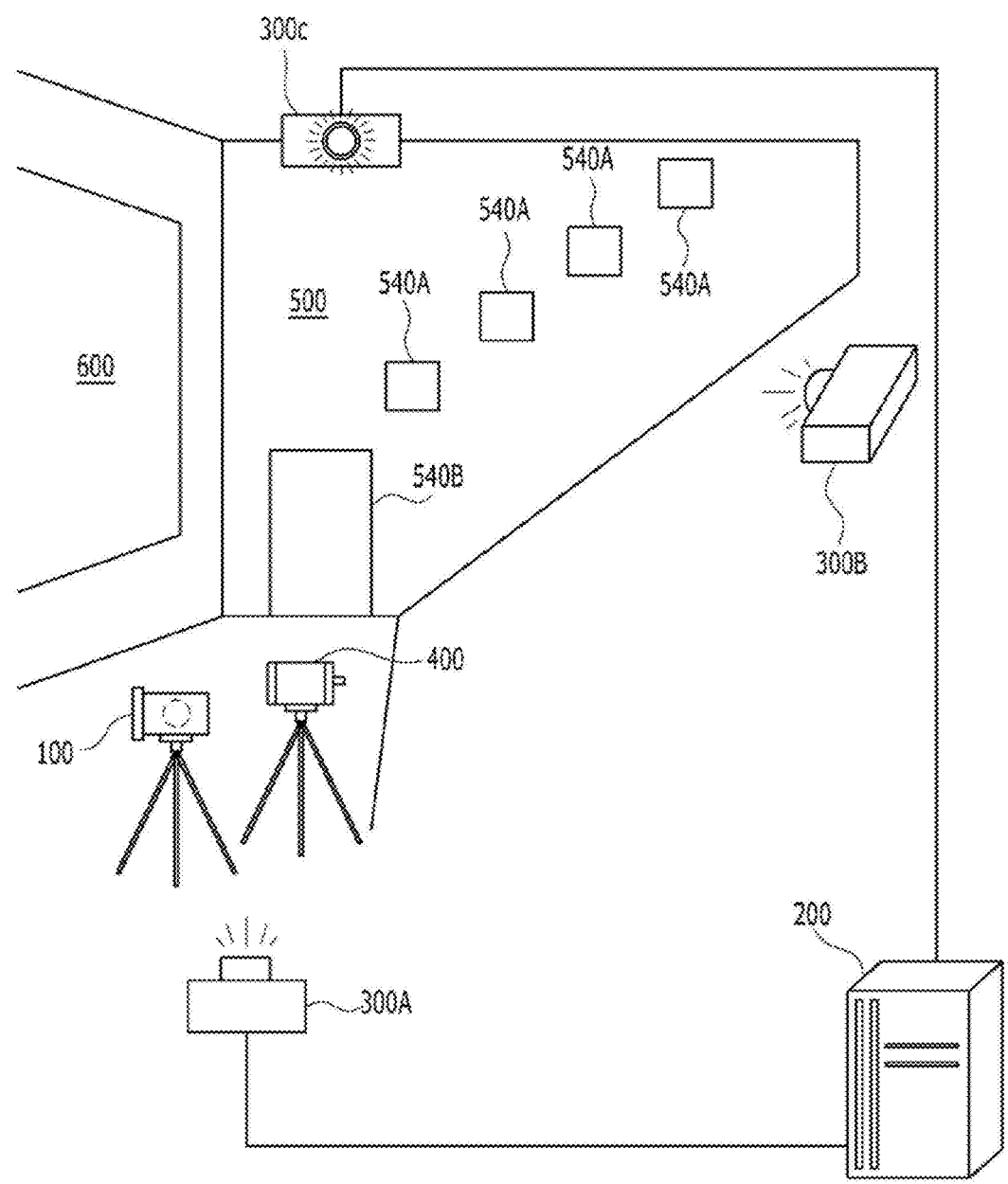
FIG. 1 is a view showing a schematic configuration of a system for automatically correcting a projection area according to the present invention.

FIG. 1 is a view schematically showing a detailed configuration of the devices needed to perform automatic correction of a projection area 310 according to the present invention.

According to FIG. 1, a system for automatically correcting a projection area 310 includes a photographing device 100, a projector 300 and a projection management device 200 and additionally further includes a laser level 400.

First, the photographing device 100 means an optical device for taking images, and the photographing device 100 of the present invention is utilized for photographing projection surfaces in a theater. Resolution of the photographing device 100 is determined on the basis of the area of the theater, the number of projectors 300 and resolution of the projectors 300. The projector 300 may project an image on a wall 500 having a horizontal length of 20 m and a vertical length of 6.6 m at a resolution of 2600*650.

In this case, the projector has a resolution of 1.3 px per centimeter (cm) in the horizontal direction.

Its calculation process is as shown below.

2600px/20m=1.3px/cm

If the number of pixels of the projector in the horizontal direction is divided by the horizontal length of the wall, the number of pixels per centimeter in the horizontal direction can be calculated.

In addition, the projector has a resolution of 0.9848 px per centimeter (cm) in the vertical direction.

Its calculation process is as shown below.

If the number of pixels in the vertical direction of the projector is divided by the vertical length of the wall, the number of pixels per centimeter in the vertical direction can be calculated.

At this point, the photographing device has a resolution higher than the number of pixels per centimeter, which is the higher among the number of pixels per centimeter in the horizontal direction and the number of pixels per centimeter in the vertical direction. That is, in the example described above, since the number of pixels per centimeter in the horizontal direction is the larger, the resolution of the camera should be 1.3 px per centimeter or higher.

The angle of view of the photographing device varies according to the focal distance of a lens. The focal distance of a lens needed for the photographing device to photograph the entire area of the wall 500 having a horizontal length of 20 m and a vertical length of 6.6 m is 18 to 24 mm.

At this point, the theater mentioned in the detailed description is generally a space for projecting movie contents and assumed to include one or more screens 600 and walls 500, and furthermore, it may be a so-called multi-surface theater which can provide audience with a sense of immersion by allowing the plurality of projectors 300 to project synchronized contents images on the screens 600 and walls 500.

Meanwhile, the photographing device 100 may function as a separate device independent from the projection management device 200 which will be described below or may be implemented to be wiredly or wirelessly connected to the projection management device 200 to directly transmit or receive photographed images.

Next, the projector 300 refers to a device for projecting a contents image on a projection surface, and a plurality of projectors 300 may be provided in the theater, and each of the projectors 300 is wiredly or wirelessly connected to the projection management device 200 which will be described below and driven under the control of the projection management device 200. In addition, a plurality of projectors 300 may be installed in correspondence to one projection surface in the theater, or one projector 300 may be installed in correspondence to a plurality of projection surfaces.

Next, the projection management device 200 controls a plurality of projectors 300 installed in the theater and manages contents images desired to be projected as a basic function, and the projection management device 200 of the present invention also performs a function of automatically correcting the projection area 310 as is described below. The function of the projection management device 200 will be described below in more detail.

Finally, the laser level 400 refers to a device for outputting light for displaying a laser line 410 on a projection surface in the theater. The laser level 400 may output a plurality of light beams on the projection surface to display laser lines 410. A further precise projection area 310 can be extracted by photographing the projection surface on which the laser lines 410 are displayed and analyzing the images of the projection surface photographed like this.

Hereinafter, a schematic process of a method of automatically correcting a projection area 310 according to the present invention will be described with reference to FIG. 2.

Figure 2:
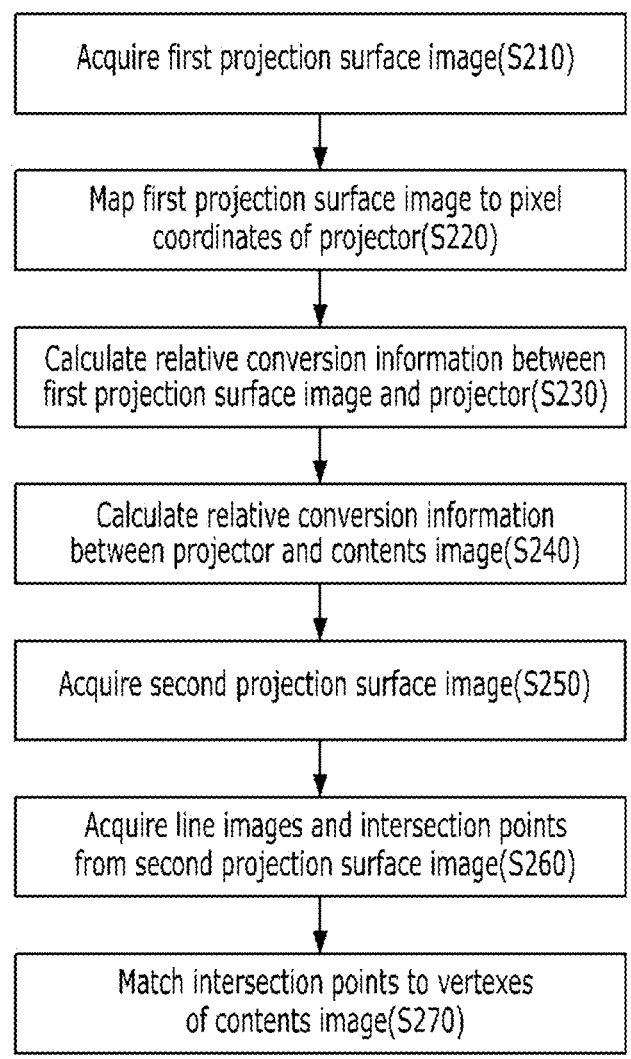
FIG. 2 is a flowchart sequentially illustrating a method of automatically correcting a projection area according to an embodiment of the present invention.

According to FIG. 2, a method of automatically correcting a projection area 310 according to the present invention includes: a first step (step S210) of acquiring a first projection surface image 10 photographed by the photographing device 100, by the projection management device 200; a second step (step S220) of mapping each pair of pixel coordinates of a projection area in the first projection surface image 10 to each pair of pixel coordinates of the projection area 310 projected by the projector 300, by the projection management device 200; and a third step (step S230) of calculating relative conversion information between the first projection surface image 10 and the projector 300 using the pixel coordinates of the first projection surface image 10 and the pixel coordinates of the projector 300, by the projection management device 200. In addition, the method further includes: a fourth step (step S240) of calculating relative conversion information between the projector 300 and a contents image; a fifth step (step S250) of acquiring a second projection surface image 30 on which laser lines 420 are displayed, by the projection management device 200; a sixth step (step S260) of extracting line images 411 from the second projection surface image 30 and acquiring intersection points 413, by the projection management device 200; and finally a seventh step (step S270) of matching the acquired intersection points 413 to vertexes of the contents image, by the projection management device 200.

Hereinafter, each of the steps will be described in detail.

The first step is a step in which the projection management device 200 acquires the first projection surface image 10, and at this point, the first projection surface image 10 means an image of a projection surface on which a light pattern is projected, which is photographed by the photographing device 100.

To correct images projected by the projectors 300 on the basis of the image acquired by the photographing device 100, it needs to know coordinates of the image acquired by the photographing device 100, to which each pixel of the projectors 300 corresponds. To this end, although a single image pattern such as a checker board has been used in the prior art, if such a single image pattern is used, it is difficult to grasp correspondence relations of all pixels, and particularly, it invites a result of decreasing accuracy if there exits an obstacle. In the present invention, a light pattern image based on a gray code is utilized to grasp the correspondence relation between the photographing device 100 and the projector for all pixels, and at this point, the structure of the light pattern image varies in time series.

Figure 3:
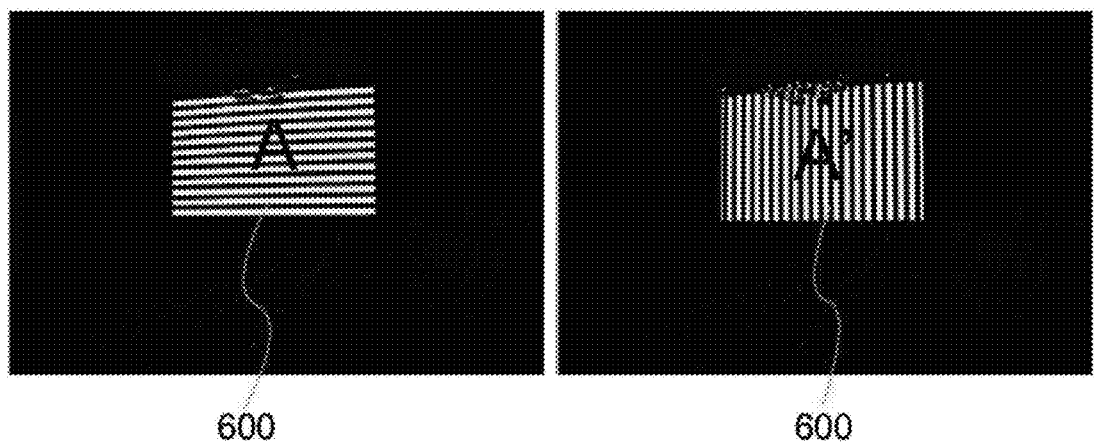
FIG. 3 is a view showing an image photographing a projection surface on which a structured light pattern is projected.

FIG. 3 is a view showing an example of the first projection surface image 10. As shown in FIG. 3, a light pattern image A and A' may be projected by alternatingly changing white and black lines in the horizontal direction, or the light pattern image may be projected by alternatingly changing white and black lines in the vertical direction, and this is an image appeared by converting coordinates of each pixel of the projector 300 into bits and projecting each place of the bits to be expressed in black and white in order of time. Although it will be described below, the projection management device 200 grasps a position of each pixel of the projector 300 from the first projection surface image 10 photographed by the photographing device 100 by analyzing an image of the projection surface (the first projection surface image 10).

Meanwhile, at this point, the gray code is a kind of bit conversion, and unlike a binary conversion, it is implemented in a method of minimizing bit conversion for adjacent digits when a decimal number is converted, and due to such a characteristic, a correspondence relation can be stably grasped since change of an error is small although the error occurs when the first projection surface image 10 is decrypted.

Meanwhile, if an arbitrary projector 300 is denoted as $P_i$ and $x_i$ denotes the pixel coordinates of the arbitrary projector Pi, bit conversion for each pair of pixel coordinates is accomplished in the method shown below.

$$(x^i >> 1) \oplus x^i \quad \text{Mathematical expression 1}$$

Mathematical expression 1 is an equation for converting a binary code into a gray code. First, coordinates xi are converted into a binary code, and the coordinates converted into a binary code are shifted one column backward. An 'exclusive or' operation is performed on the coordinates shifted one column backward after the coordinates is converted into a binary code and coordinates xi converted into a binary code. For example, when coordinates xi are (1, 2), the coordinates xi are converted into a binary code of (0000000001, 0000000010), and if a bit operation is performed to shift the binary code values one column backward, the result is (0000000000, 0000000001). If an 'exclusive or' operation is performed on the two codes of (0000000001, 0000000010) and (0000000000, 0000000001), a gray code of (0000000001, 0000000011) is calculated.

The first projection surface image 10 shown in FIG. 3 is a projection surface photographed by the photographing device 100 after bit conversion is performed on the horizontal (x-axis) and vertical (y-axis) coordinates according to mathematical expression 1 and then a pattern is created according to the value of each bit place (white if the bit is 1, and black if the bit is 0).

If the resolution of the projector 300 is 1024*768, the x coordinate is any one of 0 to 1023, and the y coordinate is any one of 0 to 767. If a pixel coordinate of the projector 300 is converted through the process described above, it is converted into a binary number of maximum ten digits. The projector 300 projects a black or white image at the position of each pixel according to the value of each place in order starting from the most significant bit of the gray code corresponding to the x or y coordinate of the corresponding pixel.

At this point, the projector 300 (1) projects a black or white image on the basis of the gray code converted from the x coordinate among the pixel coordinates, (2) projects a black or white image on the basis of the gray code converted from the y coordinate among the pixel coordinates, (3) projects a black or white image on the basis of the complement of the gray code converted from the x coordinate among the pixel coordinates, (4) projects a black or white image on the basis of the complement of the gray code converted from the y coordinate among the pixel coordinates, (5) projects an image all the pixels of which are black, and (6) projects an image all the pixels of which are white.

The method of projecting an image by the projector is not limited to the sequence of (1) to (6) and may be unrelated to the sequence of (1) to (6).

For example, when (1) a black or white image is projected on the basis of the gray code converted from the x coordinate among the pixel coordinates, coordinates (1, 2) of the projector is converted into bit coordinates of (0000000001, 0000000011) using the gray code, and since the values of the first to ninth bits are 0, the projector projects a black image nine times at the position of coordinates (1, 2) of the projector at regular time intervals. Then, since the value of the tenth bit is 1, the projector projects a white image once.

The second step is a step in which the projection management device 200 calculates relative conversion information by mapping each pair of pixel coordinates of the projection area 310 in the first projection surface image 10 to each pair of pixel coordinates of the projection area 310 actually projected by the projector 300.

Figure 4:
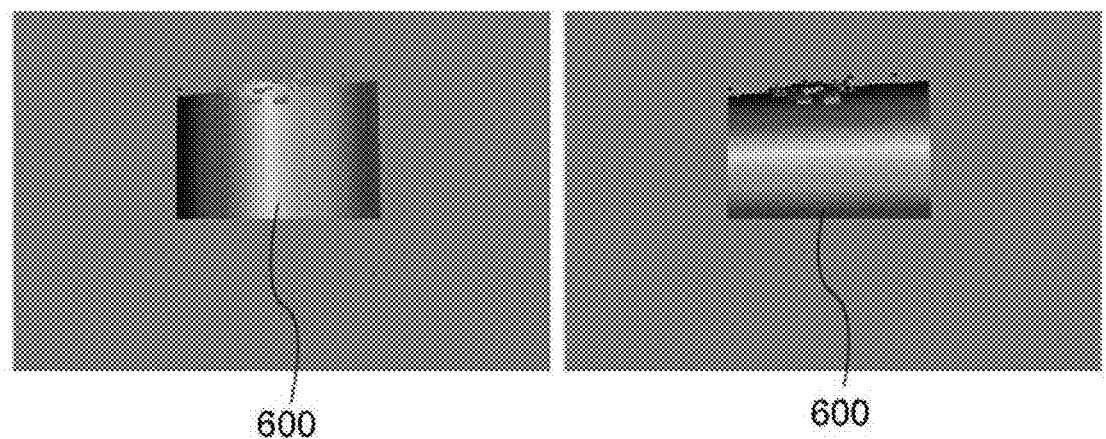
FIG. 4 shows a visualized result of analyzing the image photographed in FIG. 2.
Figure 5:
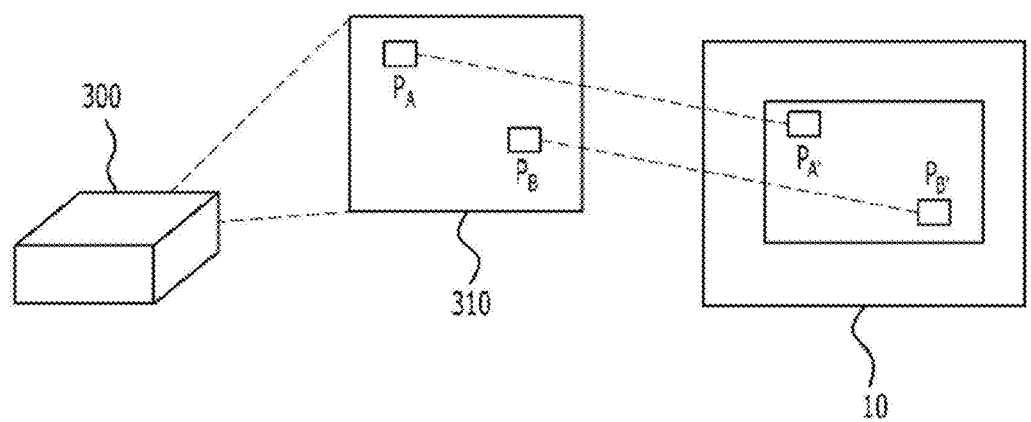
FIG. 5 conceptually shows a view of matching a projection area of a projector and the projection area in a photographed image.

The projection management device 200 grasps pixel positions of the projector 300 from the first projection surface image 10 by analyzing and decrypting the first projection surface image 10. Decryption of the first projection surface image 10 is performed such that after reading the first projection surface images 10 photographed in order of time, the projection management device 200 converts the value of each bit to 1 if the pixel value of the first projection surface image 10 is white and converts to 0 if the pixel value is black. Then, a pixel coordinate value of the projector 300 can be obtained if mathematical expression 1 is inversely calculated, and in this process, a pixel level correspondence relation between the first projection surface image 10 and the projection area 310 of the projector 300, i.e., a correspondence relation between each pair of pixel coordinates of the projection area 310 extracted from the first projection surface image 10 and each pair of pixel coordinates of the projector 300 (the projection area 310), is established. FIG. 4 shows a visualized result of analyzing the pattern of the first projection surface image 10. FIG. 5 conceptually shows a view of matching the projection area 310 of the projector 300 and the pixel coordinates of the projection area 310 in the first projection surface image 10 to each other.

The third step is a step in which the projection management device 200 calculates relative conversion information between the first projection surface image 10 and the projector 300 by utilizing the pixel coordinates of the first projection surface image 10 acquired before and the pixel coordinates of the projection area 310 of the projector 300. The relative conversion information expresses the relation between corresponding points as a homography matrix, which refers to a definition of a correspondence relation between an arbitrary point on an arbitrary plane or space and a point on another plane or space.

If an arbitrary projector 300 is denoted as $P_i$, $x_i$ denotes the pixel coordinates of the arbitrary projector Pi, and pixel coordinates corresponding to $x_i$ in the first projection surface image 10 is denoted as $c_i$, first relative conversion information $H_{i \to cam}$ for converting the pixel coordinates of the projector 300 into the pixel coordinates of the first projection surface image 10 can be obtained as shown below. (i denotes a projector 300, and cam denotes a first projection surface image 10)

$$H_{i \to cam} = \arg\min_{H} \|Hx^i - c^i\|^2 \quad \text{Mathematical expression 2}$$

Mathematical expression 2 means searching for an optimized homography matrix of xi which minimizes the positional difference between $x_i$ and $c_i$ Mathematical expression 2 may be solved using Direct Linear Transformation. Meanwhile, at this point, when the relative conversion information is calculated according to mathematical expression 2, the homography matrix can be searched for while excluding outlier values by using random sample consensus (RANSAC).

The RANSAC is an iterative method for choosing a mathematical model of a desired data form data having noises, and the RANSAC may be regarded as a non-deterministic algorithm in that a proper result can be created at a constant probability and the probability increases as the number of iteration increases.

Meanwhile, the processes of the first to third steps are processes for extracting an 'effective projection area 560' which allows audience to see well contents images among all the projection surfaces in the theater, and as is briefly described above, in the case of a wall 500 of the theater, there may be an area in which a proper projection is not accomplished due to structures 540 such as a projector, a speaker, a seat, a pillar and the like, i.e., a so-called projection obstruction area 550.

If mathematical expression 2 is calculated taking into account the correspondence relation between xi (pixel coordinates of a projector) and ci (pixel coordinates of an image corresponding to xi) created in the projection obstruction area, an accurate nomography cannot be obtained. The projection obstruction area 550 should be determined as a noise and corresponding values should be excluded from the calculation to photograph an image of the projection surface and accurately accomplish calculation of relative conversion information for matching a projection area in the photographed image to the projection area of the projector. Mathematical expression 2 is finally calculated using the RANSAC to calculate a dominant nomography excluding the projection obstruction area.

A projection obstruction area can be distinguished by obtaining second relative conversion information $H_{cam \to i}$ by calculating an inverse matrix of the first relative conversion information $H_{i \to cam}$, converting $c_i$ into a projection area 310 of the projector 300 using $H_{cam \to i}$, and determining that a structure 540 exists on the wall 500 if a difference of distance to $x_i$ corresponding to the projection area is large.

Figure 6:
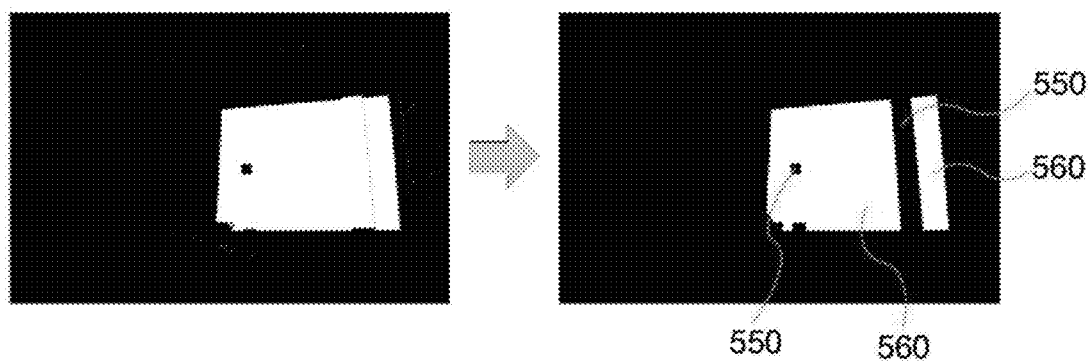
FIG. 6 is a view of showing a projection area after projection obstruction areas on a wall among the projection surfaces in a theater are filtered.

FIG. 6 is a view of showing an effective projection area 560 before the projection obstruction area 550 on the wall 500 is filtered through the processes described above and an effective projection area 560 after the projection obstruction area 550 is filtered.

Figure 7:
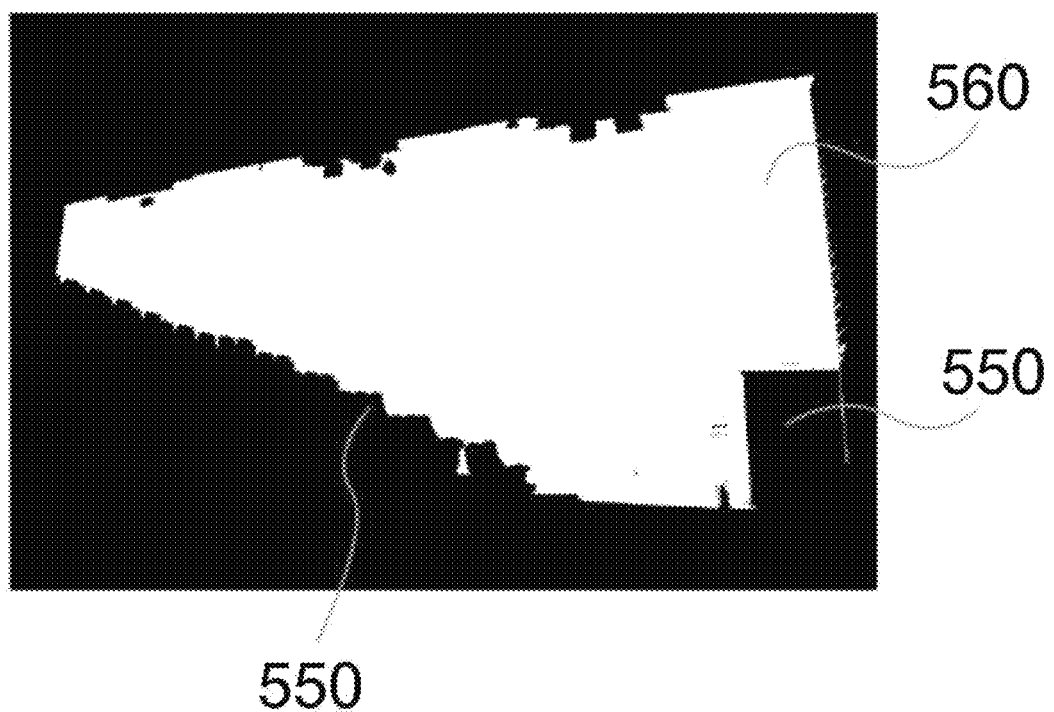
FIG. 7 shows an extracted view of an effective projection area of a wall among the projection surfaces in a theater.

Meanwhile, all the processes of the first to third steps may be performed between the projectors 300 and the projection surfaces installed in the theater, and an 'entire effective projection area 560' can be acquired by combining the effective projection areas 560 extracted by performing the steps into one area. For example, when two projectors 300 are installed in correspondence to a wall 500 on one side in the theater, the projection management device 200 may acquire an effective projection area 560 for each projector 300 if the first to third steps are performed for each of the projectors, and if the effective projection areas 560 extracted like this are combined into one area, the entire effective projection area 560 of the wall 500 on one side can be acquired. FIG. 7 is a view showing the entire effective projection area 560 obtained by combining a plurality of effective projection areas 560.

Meanwhile, in order to finally correct the projection area 310 after obtaining the effective projection area 560, relative conversion information between a contents image to be actually projected on the projection surface and the projection area 310 of the projector 300, i.e., third relative conversion information $H_{i \to image}$, should be calculated, and the fourth step of FIG. 2 corresponds to this step. (an image means a contents image)

A chain rule is used between matrixes to calculate $H_{i \to image}$, and specifically, $H_{i \to image}$ is obtained using the relative conversion information $H_{cam \to image}$ between the first projection surface image 10 and the contents image and the relative conversion information $H_{i \to cam}$ between the projector 300 and the first projection surface image 10 obtained before.

Since a correspondence relation between the projection area 310 of the projector 300 and the contents image can be defined finally if the process goes through up to the fourth step like this, as a result, the projection management device 200 may control the projector 300 to correctly project the contents image on the effective projection area 560.

Meanwhile, a multi-surface theater assumed in the present invention uses a wall 500 as a projection surface, however, it does not use the entire wall 500 as an area that can be projected and utilizes a portion of the area as an effective projection area 560. Accordingly, it needs to further precisely determine which area of the entire wall 500 is an effective projection area 560. In addition, in determining an effective projection area 560 at the time point of projecting a contents image on the wall 500, connectivity with the contents image projected on the screen 600 on the front side of the theater needs to maintain to the maximum.

To this end, the present invention proposes a method of accurately aligning an area on which a contents image is projected with the projection area 310 of the projector 300 by utilizing the laser level 400. The fifth to seventh steps of FIG. 2 describe a process of precisely aligning the projection area 310 and the contents image by utilizing the laser level 400.

Figure 8:
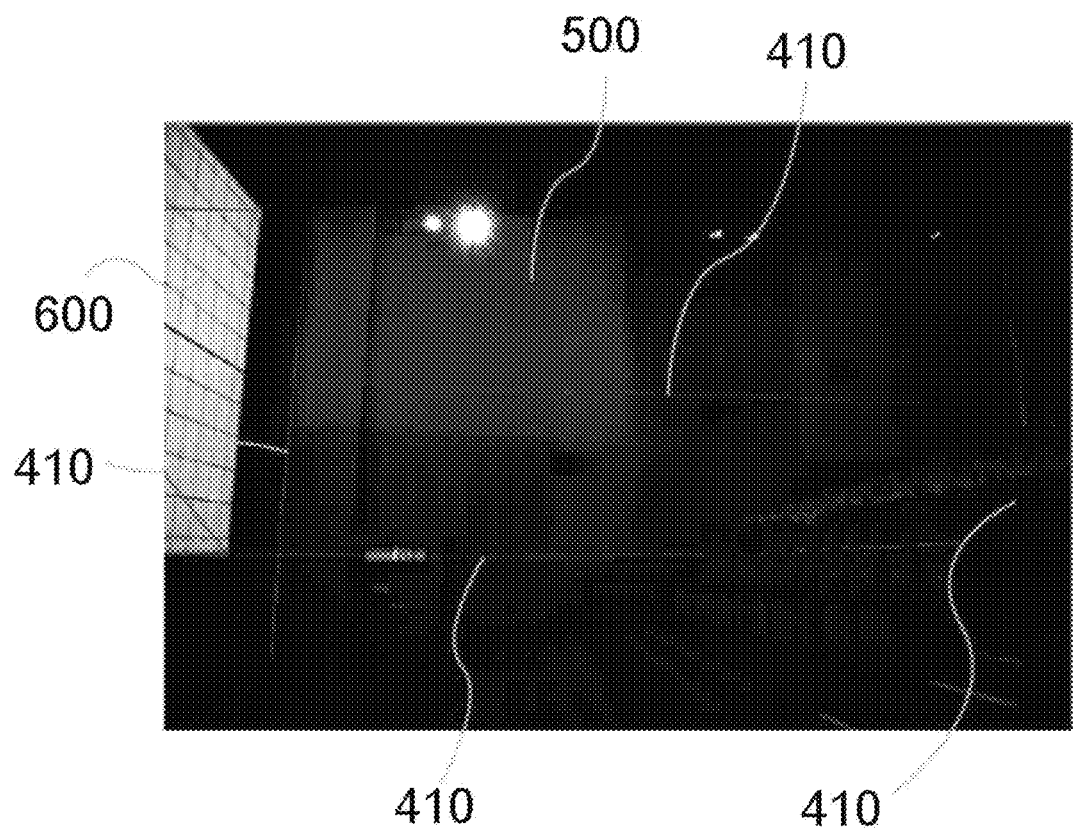
FIG. 8 is a view showing laser lines output from a laser level and displayed on a wall in a theater.

First, the fifth step is a step in which the projection management device 200 acquires second projection surface image 30 photographed by the photographing device 100, and at this point, the second projection surface image 30 is an image photographed while laser lines 410 output from the laser level 400 are displayed on the projection surface. FIG. 8 is a view showing the second projection surface image 30 photographed by the photographing device 100 while the laser lines 410 are radiated on the wall 500 on one side of the theater. Referring to FIG. 8, the laser level 400 may be installed in plurality so that four laser lines 410 (up/down/left/right) can be displayed on the projection surface, and at this point, particularly, a laser level 400 corresponding to the bottom side is preferably installed to be aligned with the bottom line of the front screen 600. In addition, a laser level 400 corresponding to the top side is preferably installed to be aligned with a horizontal axis line passing through the center of the front screen 600. The laser levels are installed to align the top side and the bottom side of the laser lines 410 with the front screen 600 to maintain the connectivity between the contents image projected on the wall 500 and the contents image projected on the front screen 600 to the maximum as mentioned above. Meanwhile, laser levels 400 corresponding to the left side and the right side are installed to correspond to the start and the end of the contents image in the horizontal direction.

Figure 9:
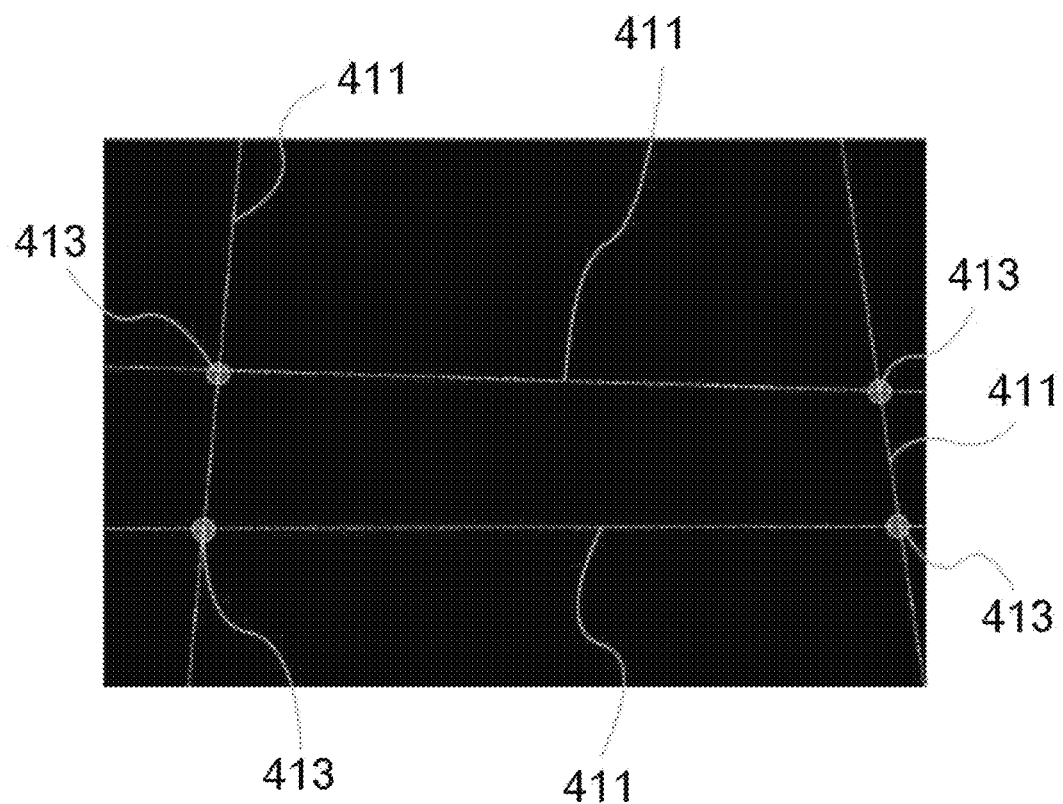
FIG. 9 is a view showing intersection points created by intersections of laser lines.

The sixth step is a step in which the projection management device 200 extracts a plurality of line images 411 from the second projection surface image 30 on which the laser lines 410 are displayed and acquires intersection points 413 created by intersections of the line images 411. The laser lines 410 are preferably displayed in red color, and the projection management device 200 may extract only the line images 411 by extracting pixels of high R value by analyzing the RGB channel for the second projection surface image 30. In addition, the line images 411 extracted as described above necessarily intersect each other and create intersection points 413, and the projection management device 200 obtains an equation of a straight line by performing Hough Transform on the line images 411 and calculates the intersection points 413 from the equation of a straight line of each side. FIG. 9 is a view showing the line images 411 extracted from the second projection surface image 20 of FIG. 8 and the intersection points 413 calculated from the line images.

Finally, the seventh step is a step in which the projection management device 200 matches the calculated intersection points 413 to vertexes of the contents image. That is, the projection management device 200 may calculate relative conversion information $H_{cam \to image}$ between the second projection surface image 30 and the contents image in a method as shown in mathematical expression 2, and the relative conversion information $H_{cam \to image}$ calculated like this may be eventually utilized to calculate relative conversion information $H_{i \to image}$ between the projector 300 and the contents image by the relation of chain rule with the relative conversion information $H_{i \to cam}$ between the projector 300 and the second projection surface image 30 ($H_{i \to cam}$ is also calculated in a method as shown in mathematical expression 2).

As a result, the projection management device 200 may control the projector 300 to project the contents image to be accurately aligned with the projection area 310 of the projector 300 by obtaining relative conversion information between the projector 300 and the contents image.

Although the present invention has been disclosed as described above, those skilled in the art may recognize that the present invention may be embodied in a different form while maintaining the spirit and essential features of the present invention.

Accordingly, the embodiments described above are merely illustrative and not intended to restrict the scope of the present invention only to the aforementioned embodiments. Furthermore, the flowcharts shown in the figures are merely a sequence of illustrative purposes to obtain a most preferably result in embodying the present invention, and it is apparent that other steps may be further included or some steps may be deleted.

Although the scope of the present invention will be defined by the claims, configurations directly derived from the disclosure of the claims, as well as all the changed or modified forms derived from the configurations and equivalents thereof, should be interpreted as being included in the scope of the present invention.

DESCRIPTION OF SYMBOLS

10: First projection surface image
30: Second projection surface image
100: Photographing device
200: Projection management device
300: Projector
310: Projection area
400: Laser level
410: Laser line
411: Line image
413: Intersection point
500: Wall projection surface
540: Structure
550: Projection obstruction area
560: Effective projection area
600: Screen
A, A': Light pattern image

The invention claimed is:

1. A method of automatically correcting a projection area, the method comprising:
   (a) acquiring a first projection surface image photographed by a photographing device;
   (b) mapping each pair of pixel coordinates of a projection area in the first projection surface image to each pair of pixel coordinates of a projection area projected by a projector; and
   (c) calculating first relative conversion information between the first projection surface image and the projector using the pixel coordinates of the first projection surface image and the pixel coordinates of the projector;
   (d) calculating second relative conversion information $H_{i \to image}$ between the projector and a contents image; and
   (e) acquiring a second projection surface image on which laser lines are displayed, wherein the laser lines are displayed by light output from a laser level,
   wherein the first projection surface image is an image of a projection surface on which a light pattern is projected, and
   wherein the acquiring the first projection surface image includes,
      converting each pair of pixel coordinates of the projector into bits, and
      projecting a black and white image at the each pair of pixel coordinates of the projector in order of time.

2. The method according to claim 1, wherein the acquiring the first projection surface image further includes:
   photographing a projection surface on which the black and white image is projected, by the photographing device.

3. The method according to claim 1, wherein a plurality of projectors is provided in correspondence to one projection surface, and steps (a) to (c) are performed on the first projection surface image projected by each projector, and an entire effective projection area is acquired by combining effective projection areas of the projectors.

4. The method according to claim 1, further comprising:
   (f) extracting a plurality of line images from the second projection surface image and acquiring intersection points created by intersections of the line images; and
   (g) matching the acquired intersection points to vertexes of the contents image.

5. A method of automatically correcting a projection area, the method comprising:
   (a) acquiring a first projection surface image photographed by a photographing device;
   (b) mapping each pair of pixel coordinates of a projection area in the first projection surface image to each pair of pixel coordinates of a projection area projected by a projector; and
   (c) calculating relative conversion information between the first projection surface image and the projector using the pixel coordinates of the first projection surface image and the pixel coordinates of the projector,
   wherein the first projection surface image is an image of a projection surface on which a light pattern is projected,
   wherein step (a) includes,
      converting each pair of pixel coordinates of the projector into bits, and
      projecting a black and white image at the each pair of pixel coordinates of the projector in order of time, wherein step (c) includes:
extracting an arbitrary reference pixel $x_i$ from the projection area of the projector,
extracting a corresponding pixel $c_i$ corresponding to the reference pixel $x_i$ from the first projection surface image, and
calculating first relative conversion information $H_{i \to cam}$ by putting the reference pixel $x_i$ and the corresponding pixel $c_i$ in a relative conversion equation, and
wherein the relative conversion equation is $H_{i \to cam} = \arg\min \|Hx^i - c^i\|^2$, wherein $x^i$ denotes the reference pixel of the projection area, and $c^i$ denotes the corresponding pixel of the first projection surface image.

6. The method according to claim 5, wherein at step (c), second relative conversion information $H_{cam \to i}$ is further calculated, and $H_{cam \to i}$ denotes an inverse matrix of the first relative conversion information $H_{i \to cam}$.

7. The method according to claim 6, wherein the second relative conversion information $H_{cam \to i}$ is calculated using Random Sample Consensus (RANSAC), and a projection obstruction area created by a structure provided on the projection surface is removed from an effective projection area acquired at step (c) based on the second relative conversion information $H_{cam \to i}$.

8. A system for automatically correcting a projection area, the system comprising:
a projector configured to project an image of a projection area in a theater;
a photographing device configured to photograph a projection surface;
a laser level configured to output light for displaying laser lines on the projection surface; and
a projection management device configured to
acquire a first projection surface image photographed by the photographing device,
calculate relative conversion information by mapping each pair of pixel coordinates of a projection area in the first projection surface image to each pair of pixel coordinates of the projection area projected by the projector, and
acquire an effective projection area of the projector on the basis of the relative conversion information,
wherein the first projection surface image is an image of a projection surface on which a light pattern is projected by the projector,
wherein the projection management device is configured to acquire a second projection surface image photographed by the photographing device which includes said laser lines, and
wherein the projector is configured to
convert each pair of pixel coordinates of the projector into bits and
project a black and white image at each pair of pixel coordinates of the projector in order of time.

9. The system according to claim 8, wherein the projection management device is configured to
extract a plurality of line images from the acquired second projection surface image,
acquire intersection points created by intersections of the line images, and
match the acquired intersection points to vertexes of a contents image.

10. A system for automatically correcting a projection area, the system comprising:
a projector configured to project an image of a projection area in a theater;
a photographing device configured to photograph a projection surface; and
a projection management device configured to
acquire a first projection surface image photographed by the photographing device,
calculate relative conversion information by mapping each pair of pixel coordinates of a projection area in the first projection surface image to each pair of pixel coordinates of the projection area projected by the projector, and
acquire an effective projection area of the projector on the basis of the relative conversion information,
wherein the first projection surface image is an image of a projection surface on which a light pattern is projected by the projector,
wherein the projector is configured to
convert each pair of pixel coordinates of the projector into bits and
project a black and white image at each pair of pixel coordinates of the projector in order of time, and
wherein the projection management device is configured to
extract an arbitrary reference pixel $x_i$ from the projection area of the projector,
extract a corresponding pixel $c_i$ corresponding to the reference pixel $x_i$ from the first projection surface image,
calculate the relative conversion information $H_{i \to cam}$ by putting the reference pixel $x_i$ and the corresponding pixel $c_i$ in a relative conversion equation, and
the relative conversion equation is $H_{i \to cam} = \arg\min \|Hx^i - c^i\|^2$, wherein $x^i$ denotes the reference pixel of the projection area, and $c^i$ denotes the corresponding pixel of the first projection surface image.

* * * * *